United States Patent Office 3,634,479
Patented Jan. 11, 1972

3,634,479
TIN-OXYGEN-PHOSPHOROUS BOND COMPOUNDS
Richard E. Ridenour and Edward E. Flagg, Midland,
Mich., assignors to The Dow Chemical Company, Midland, Mich.
No Drawing. Continuation-in-part of abandoned application Ser. No. 757,745, Sept. 5, 1968. This application Sept. 8, 1970, Ser. No. 70,518
Int. Cl. C08g 33/16, 33/20; C07f 7/22
U.S. Cl. 260—429.7           12 Claims

ABSTRACT OF THE DISCLOSURE

New inorganic polymers having tin-oxygen-phosphorus bonding and the method of preparing the same are taught. The new compounds are prepared by contacting a tin source material with a phosphorus compound characterized as having one phosphoryl moiety ($\equiv$P---O) wherein the phosphorus atom is partially double bonded to an oxygen atom and also has at least one labile group bonded thereto. The polymers have one coordinate bond between the tin-oxygen and phosphorous atoms. The inorganic polymers are useful for preparing protective films, lubricants, hydraulic fluids, as a stabilizer and flame retardant additive in plastics, and are biologically active and can be employed for insecticides, herbicides and the like.

---

This application is a continuation-in-part of copending application Ser. No. 757,745, filed Sept. 5, 1968, now abandoned.

The term "inorganic polymers" as employed herein means polymers which do not contain any carbon in the polymer backbone, i.e. chain.

PREFERRED EMBODIMENTS OF THE INVENTION

More specifically the novel polymers of the present invention are prepared by reacting a certain tin source material with a phosphorous containing compound in a predetermined molar ratio to each other, in an inert solvent at a temperature no greater than about the reflux temperature of the specific solvent employed.

The tin source material is a tin compound corresponding to the formula

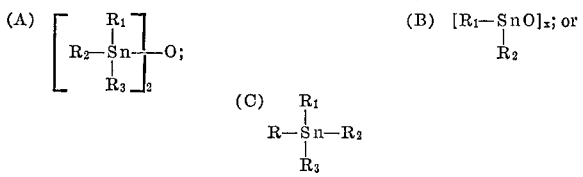

wherein R, $R_1$, $R_2$ and $R_3$ designate the same or different alkyl, aryl, alkaryl or cycloalkyl group and $x$ is a rational number greater than 1. The third tin compound, Formula C, is further characterized by the fact that at least one of R, $R_1$, $R_2$ or $R_3$ represents a labile group. The labile group can be any one or more of a hydrogen, halogen, hydroxyl or alkoxy group. As indicated, the R, $R_1$, $R_2$ and $R_3$ groups can be the same or they can consist of different members selected from the groups defined herein. Specific examples of tin compounds which can be employed as the tin source material include $(C_4H_9)_3SnH$, $(CH_3)_3SnCl$, $(C_4H_9)_2SnO$, $CH_3SnCl_3$, $SnCl_4$, $SnBr_4$, $SnO_2$, $(C_5H_{11})_2SnH_2$, $(C_2H_5)_3SnOCH_3$, $(C_6H_5)_3SnH$ $[(CH_3)_3Sn]_2O$, $(C_6H_{11})_2SnH_2$, $(C_6H_{11})_3SnOH$, and other like compounds. Preferably the tin source material consists of an organotin compound and most preferably an organotin hydride compound.

The phosphorus containing compound corresponds to the formula

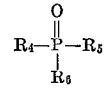

wherein $R_4$, $R_5$ and $R_6$ each represent the same or different members consisting of an alkyl, aryl, alkaryl or cycloalkyl group; or a labile group consisting of an alkoxy, OH, or halogen group wherein at least one of $R_4$, $R_5$ or $R_6$ represents one of said labile groups. The organic group may be a hydrocarbon or an organic group substituted with one or more functional groups.

Specific phosphorous compounds which may be employed include, for example, phosphoric acid, phosphonic acid, $R_4P(O)(OH)_2$ or phosphinic acid

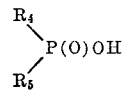

wherein $R_4$ and $R_5$ are organic groups as defined hereinbefore.

Other compounds include those wherein one or 2 of the $R_4$, $R_5$ and $R_6$ groups consist of halogen or —OH group, while the remaining group(s) is an organo-oxy group (R'O—) wherein the oxygen is bonded to the phosphorous atom and wherein the organo group (R') is an alkyl, aryl, alkaryl or cycloalkyl group. For example, such compounds included

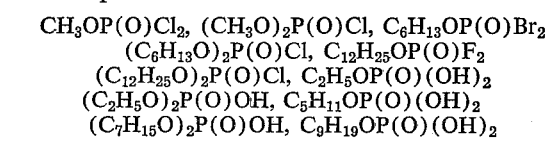

$(C_{11}H_{23}O)_2P(O)OH$ and the like. The organo-oxy group (R'O—) may contain up to about 12 carbon atoms in either a branched or straight chain configuration.

Examples of other specific phosphorous compounds which can be employed include $C_6H_5P(O)(OH)_2$,

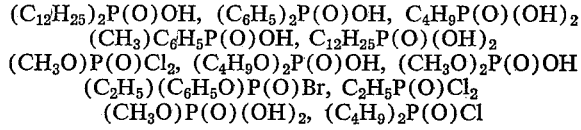

The inert solvents employed should be substantially anhydrous and can comprise ether compounds such as diethyl ether, di-n-propyl ether, isopropyl ether, tetrahydrofuran and the like. Other inert solvents such as, for example, benzene, xylene, toluene, cyclohexane, and the like may also be employed.

The total concentration of the reactants in the solvent has not been found to be critical. Maximum concentrations are usually those such that the reactants are completely in solution at the operating temperature employed. Extremely dilute solutions are usually not preferred because of the difficulties in handling and separating the polymers from the solvent. Solutions ranging in concentration from about .01 molar to about 1 molar with respect to the individual reactants can be employed. However, as is demonstrated more fully hereinafter, the specific mole ratio of reactants is important in determining the type of polymer which is prepared.

As indicated, the reaction is usually carried out at a maximum temperature about equal to the reflux temperature of the solvent employed. Higher or lower temperatures can be employed, however, they usually affect the rate of reaction. Therefore, for convenience and ease of separation of the polymer product, the reflux temperature of the specific inert solvent employed is normally used.

All the processing conditions are usually carried out under an inert, substantially anhydrous atmosphere such as, for example, under a nitrogen or argon atmosphere.

Various types, i.e. polymeric configurations, of polymers can be prepared by employing certain predetermined reactants in certain predetermined mole ratios. In general, the polymer is prepared in one of four configurations. The method of preparation and the structural designation of each type is set forth as follows. In each instance $n$ is a rational number greater than 1.

TYPE I

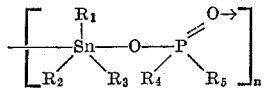

The Type I polymer is prepared by reacting a tin compound corresponding to Formula A or C containing only one labile group consisting of a halogen or hydrogen, with a phosphorous compound which contains at least one —OH group. Phosphorous compounds include compounds corresponding to the formula

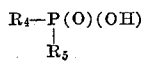

wherein $R_4$, $R_5$ are the same or different alkyl, aryl, alkaryl, cycloalkyl, alkoxy, OH or halogen group. These compounds include phosphonic, phosphinic and phosphoric acids as defined hereinbefore. The Type I polymer can also be prepared by reacting a tin compound corresponding to Formula C which contains one —OH with a phosphorous compound which contains at least one halogen labile group, e.g. $(CH_3)_2P(O)Cl$ and the like. The reactants are provided in about equi-molar amounts.

TYPE II

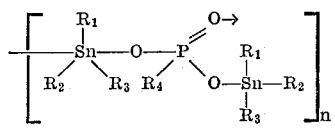

The Type II polymer is prepared by reacting a tin compound corresponding to Formula A or C containing at least one hydrogen or halogen labile group, with a phosphorous compound which contains at least two of an alkoxy or —OH labile group. Phosphorous compounds include phosphoric acid and phosphonic acid as defined hereinbefore. The Type II polymer may also be prepared by reacting a tin compound corresponding to Formula C which contains at least one —OH or alkoxy labile group with a phosphorous compound which contains at least two halogen labile groups, e.g. $C_5H_{11}P(O)Br_2$. The reactants are employed in an amount to provide a gram-mole ratio of about 2/1 (tin compound/phosphorus compound).

TYPE III

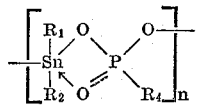

The Type III polymer is prepared by reacting a tin compound corresponding to the Formula B or C containing at least two labile groups, with a phosphorous compound which contains at least two —OH or alkoxy labile groups. Phosphorous compounds include phosphonic acid and phosphoric acid as defined hereinbefore. The reactants are employed in about equimolar amounts. The polymer can also be prepared by reacting a tin compound corresponding to Formula C containing at least two —OH or alkoxy labile groups with a phosphorous compound which contains at least two halogen labile groups.

TYPE IV

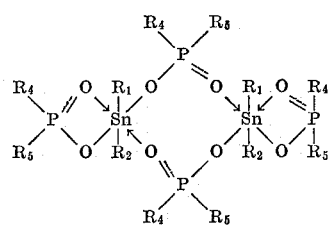

The Type IV compound is prepared by reacting a tin compound corresponding to Formula B or C which contains at least two labile groups, with a phosphorous compound which contains only one —OH or alkoxy labile group. The reactants are employed in a gram mole ratio of about 1/2 (tin compound/phosphorous compound).

In these copolymers of the various types depicted herein, the various R groups are the same as defined hereinbefore. In the Type IV polymer, $R_4$ and $R_5$ are the same as defined hereinbefore except that they do not include —OH, and may include an organo-oxy group as defined hereinbefore.

By halogen group it is meant $Cl^-$, $Br^-$, $I^-$ for the tin compound and additionally $F^-$ for the phosphorous compound.

Certain of the copolymers as defined hereinbefore have been found to be stable to hydrolysis when suspended in boiling water for more than 72 hours.

The inorganic polymers are useful for preparing protective films, lubricants, hydraulic fluids, as a stabilizer and flame retardant additive in plastics, and are biologically active and can be employed for insecticides, herbicides and the like.

The following examples will facilitate a more complete understanding of the present invention but it is not meant that the invention is limited thereto.

EXAMPLES 1–8

PREPARATION OF TYPE I POLYMERS

Example 1

Tri-n-butyltin hydride, 4.80731 grams (0.016517 mole) was dissolved in 1500 ml. of tetrahydrofuran and transferred to a one-neck, 2 liter flask equipped with a magnetic stirrer and a nitrogen purged reflux condenser. Methyl phosphonic acid, 1.58604 grams (0.016517 mole) was added to the flask whereupon the mixture was observed to bubble gently. The reaction mixture was allowed to reflux for about 16 hours and the product was separated from the solvent. The product was a white solid having a melting point of about 65° C. and a molecular weight of 795 (D.P. [degree of polymerization]=2.1). Partial elemental analysis showed Sn—30.65%, C—40.50%, H—8.20% and P—8.07%.

Calculated analysis for the Type I polymer having recurring monomeric units corresponding to the formula

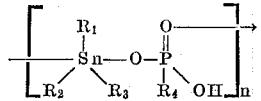

wherein $R_1$, $R_2$ and $R_3$ are butyl groups and $R_4$ is a methyl group is Sn—30.82%, C—40.55%, H—8.16% and P—8.04%. Infrared analysis supported the Type I structure of the product.

Example 2

In the same manner as in Example 1, 4.73536 grams (0.016270 mole) of tri-n-butyltin hydride was reacted with 2.80043 grams (0.01627 mole) benzyl phosphonic acid in 500 ml. of tetrahydrofuran. The product was a white solid having a melting point of about 55° C. and a molecular weight of 845 (D.P.=1.8). Partial elemental analysis showed Sn—25.55%, C—49.90%, H—7.52% and P—6.47%. Calculated analysis for a polymer having a Type I structure, as shown in Example 1, wherein $R_1$, $R_2$ and $R_3$ are butyl groups and $R_4$ is a benzyl group is Sn—25.74%, C—49.49%, H—7.65% and P—6.72%. Infrared analysis supported the Type I structure for the product.

Example 3

Tri-n-butyltin hydride (5.94144 grams—0.02041 mole) was dissolved in 1500 ml. of cyclohexane and transferred to a one-neck, 2 liter flask equipped with a magnetic stirrer and nitrogen purged reflux condenser. Di-n-hexyl phosphinic acid (4.78251 grams—0.02041 mole) was added to the flask whereupon the mixture was observed to bubble gently. The mixture was allowed to reflux for about 16 hours and then the solvent was removed and a viscous liquid was obtained. Partial elemental analysis showed Sn—22.55%, C—54.35%, H—9.77% and P—5.96%. The calculated analysis for a Type I polymer having recurring monomeric units of

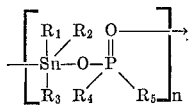

wherein $R_1$, $R_2$ and $R_3$ represent butyl groups and $R_4$ and $R_5$ represent hexyl groups is Sn—22.68%, C—55.08%, H—10.21% and P—5.92%.

The molar molecular weight of the compound was found to be 1890 corresponding to a D.P. of 5.6. Infrared techniques, nuclear magnetic resonance analysis (NMR), and Mossbauer spectra supported this structure. The product was soluble in organic solvents.

Example 4

Following the procedure of Example 3, 6.15730 grams (0.017541 mole) of triphenyltin hydride was reacted with 4.31944 grams (0.017541 mole) of dibenzylphosphinic acid employing toluene as a solvent. The product was a white powder having a molecular weight of 1875 having a D.P. of 2.7. Partial elemental analysis showed Sn—19.90%, C—63.40%, H—4.66% and P—5.26%. The calculaed analysis for a Type I polymer wherein $R_1$, $R_2$ and $R_3$ represent phenyl groups and $R_4$ and $R_5$ represent benzyl groups is Sn—19.90%, C—64.60%, H—4.91% and P—5.20%.

The product had a melting point of about 350° C. and was soluble in aromatic solvents.

Example 5

Following the procedure of Example 3, tri-n-butyltin hydride, 4.74796 grams (0.016313 mole), was reacted with 1.53428 grams (0.016313 mole) of dimethylphosphinic acid in 500 ml. of tetrahydrofuran. The product was a viscous liquid having a molecular weight of 2540 corresponding to a D.P. of 6.6. Partial elemental analysis showed Sn—30.65%, C—44.30%, H—8.68% and P—8.02%. Calculated analysis for a Type I polymer wherein $R_1$, $R_2$ and $R_3$ are butyl groups and $R_4$ and $R_5$ are methyl groups is Sn—30.98%, C—43.90%, H—8.69% and P—8.09%. Infrared techniques showed the product to have a structure similar to that shown in Example 3.

Example 6

Following the procedure of Example 3, diphenylphosphinic acid, 8.68 grams (0.04 mole) was reacted with a solution of 11.84 grams (0.02 mole) of bis-tributyltin oxide-[(n—$C_4H_9$)$_3$Sn]$_2$O; in 500 ml. of benzene. The product, a white solid, was obtained after refluxing the mixture and capturing the resultant water in a Dean-Starke trap, then removing the solvent in vacuo. The product had a melting point of about 220° C. Its molecular weight was 920, corresponding to a D.P. of 1.8. Partial elemental analyses showed Sn—23.20%, C—56.85%, H—7.42%, P—6.03%. Calculated analyses for this Type I polymer wherein $R_1$, $R_2$ and $R_3$ are butyl groups and $R_4$ and $R_5$ are phenyl groups is Sn—23.40%, C—56.83%, H—7.35% and P—6.11%. The structure was supported by infrared analysis.

Example 7

Tricyclohexyltin chloride, 14.570 grams (0.0362 mole) was mixed with 10.511 grams (0.0362 mole) of di-n-octylphosphinic acid and about 0.833 grams (0.0362 mole) of sodium metal was added to this mixture. After refluxing the mixture for 16 hours, the resultant sodium chloride was washed out of the solution with water. After re-crystallization from n-heptane, the product was a white solid having a melting point of 120° C. Partial elemental analysis gave Sn—17.70%, C—61.95%, H—10.23%, P—4.81%. Theoretical analyses for the Type I polymer wherein $R_1$, $R_2$ and $R_3$ are cyclohexyl groups and $R_4$ and $R_5$ are octyl groups is Sn—18.10%, C—62.10%, H—10.20% and P—4.72%.

Example 8

To a 3-neck, 1 liter flask equipped with additional funnel, reflux condenser, nitrogen head, and magnetic stirrer was added 500 ml. of tetrahydrofuran, 26.28 grams (0.018 mole) of diethyl chlorophosphate, and 68.60 grams (0.018 mole) of tricyclohexyltin hydroxide. After refluxing in tetrahydrofuran for 2 hours, 500 ml. of xylene was added and the tetrahydrofuran was removed by distillation.

The product was isolated by vacuum distillation of the xylene. It was white solid (M.P. 120° C.). Partial elemental analysis showed Sn—21.6%, C—49.4%, H—8.06% and P—4.39%. Theoretical analysis for

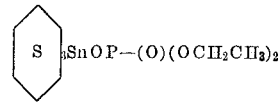

is Sn—22.8%, C—50.7%, H—8.31% and P—5.95%.

EXAMPLES 9–11
PREPARATION OF TYPE II POLYMERS

Example 9

Following the operating procedure of Examples 1–8, tri-n-butyltin hydride 3.45096 grams (0.011857 mole) was reacted with 0.56927 gram (0.0059286 mole) of methyl phosphonic acid in 500 ml. of tetrahydrofuran. The product was a viscous liquid having a molecular weight of 2700 corresponding to a D.P. of 4.0. Partial elemental analysis showed Sn—34.85%, C—44.60%, H—8.54% and P—4.75%. The calculated analysis for a Type II polymer having recurring monomeric units of

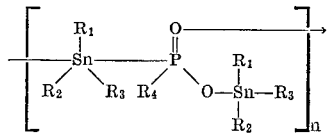

wherein $R_1$, $R_2$ and $R_3$ represent butyl groups and $R_4$ represents a methyl group is Sn—35.21%, C—44.55%, H—8.52% and P—4.59%.

Infrared techniques of analysis supported this structure for the product.

The product was soluble in organic solvents.

Example 10

In a manner similar to that employed in Example 9, tri-n-butyltin hydride 3.77897 grams (0.012983 mole) was reacted with 1.11736 grams (0.006911 mole) of benzyl phosphonic acid in 500 ml. of tetrahydrofuran. The product was a viscous liquid having a molecular weight of 2025 corresponding to a D.P. of 2.7. Partial elemental analysis gave Sn—32.45%, C—49.70%, H—8.10% and P—4.15%. Theoretical analysis for a polymer corresponding to the Type II configuration set forth in Example 9, wherein $R_1$, $R_2$ and $R_3$ are butyl groups and $R_4$ is a benzyl group is Sn—31.64%, C—49.63%, H—8.20% and P—4.13%. Infrared, Mossbauer and NMR techniques of analysis verified the Type II structure. The product was soluble in organic solvents.

Example 11

In the same manner as in Examples 9 and 10, tri-n-butyltin hydride, 2.81143 grams (0.009660 mole) was reacted with n-octylphosphonic acid in 500 ml. of tetrahydrofuran. The product was a viscous liquid having a molecular weight of 2008 corresponding to a D.P. of 2.6. Partial elemental analysis gave Sn—30.50%, C—49.90%, H—9.34% and P—4.18%. Theoretical analysis for a polymer having a Type II structure wherein $R_1$, $R_2$ and $R_3$ are butyl groups and $R_4$ is an octyl group is Sn—30.74%, C—49.77%, H—9.27% and P—4.01%.

EXAMPLES 12–14
PREPARATION OF TYPE III POLYMERS

Example 12

In a manner similar to that employed in the previous examples, 5.68319 grams (0.0024194 mole) of di-n-butyltin hydride was reacted with 4.72220 grams (0.024190 mole) of n-octylphosphonic acid in tetrahydrofuran. The product was a slow flowing plastic material having a melting point of about 290° C. and soluble in organic solvents. The product had a molecular weight of 15,700 corresponding to a D.P. of 37. Partial elemental analysis showed Sn—28.50%, C—43.37%, H—7.89% and P—7.60%. Calculated analysis for a Type III polymer having recurring monomeric units of

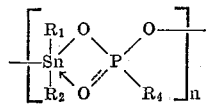

wherein $R_1$ and $R_2$ are butyl groups and $R_4$ is an octyl group, is Sn—27.91%, C—45.20%, H—8.29% and P—7.28%.

Infrared, Mossbauer and NMR analysis supported the Type III structure for the product.

The product was molded into shapes by subjecting it to a pressure of about 10,000 p.s.i. at a temperature of about 150° C.

Example 13

Following the procedure of Example 12, di-n-butyltin dihydride, 3.51652 grams (0.01496 mole) was reacted with 2.48700 grams (0.01496 mole) of n-hexyl phosphonic acid in 500 ml. of tetrahydrofuran. The product was a white solid having a melting point of about 310° C. had a molecular weight of 3250 corresponding to a D.P. of 8.2. Partial elemental analysis gave Sn—29.80%, C—42.20%, H—7.79% and P—7.85%. Calculated analysis for a polymer having the Type III structure wherein $R_1$ and $R_2$ are butyl groups and $R_4$ is a hexyl group is Sn—29.89%, C—42.35%, H—7.87% and P—7.80%. Infrared analysis verified that the product corresponded to the Type III structure.

Example 14

Following the procedure of Example 12, di-n-butyltin dihydride, 3.79181 grams (0.016134 mole) was reacted with 2.77785 grams (0.016134 mole) of benzylphosphonic acid in 500 ml. of tetrahydrofuran. The product was a white solid having a melting point of about 290° C. and had a molecular weight of 8400 corresponding to a D.P. of 20.8. The product was soluble in organic solvents. Partial elemental analysis showed Sn—29.27%, C—44.40%, H—6,12% and P—7.70%. Calculated analysis for the Type III structure wherein $R_1$ and $R_2$ are butyl groups and $R_4$ is a benzyl group is Sn—29.44%, C—44.70%, H—6.25% and P—7.68%. Infrared analysis supported the Type III structure.

EXAMPLES 15–17
PREPARATION OF TYPE IV DIMER

Example 15

In a manner similar to that of Example 1, di-n-butyltin dihydride, 3.61100 grams (0.01536 mole) was reacted with 7.19836 grams (0.03072 mole) of di-n-hexylphosphinic acid in 1500 ml. of cyclohexane. The product was solid having a melting point of about 250° C. and a molecular weight of 1400 (D.P.=2). Partial elemental analysis showed Sn—16.75%, C—54.05%, H—9.84% and P—8.75%. Calculated analysis for the dimer corresponding to the formula

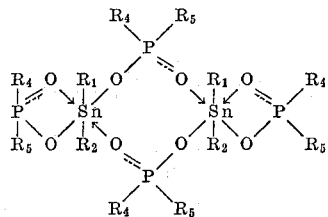

wherein $R_1$ and $R_2$ are butyl groups and $R_4$ and $R_5$ are hexyl groups is Sn—16.69%, C—54.94%, H—10.08% and P—8.85%.

Infrared analysis supported the Type IV structure of the compound. The product was soluble in organic solvents.

Example 16

As in Example 15, di-n-butyltin dihydride 3.84358 grams (0.016342 mole) was reacted with 7.86187 grams (0.032384 mole) n-hexyl-benzylphosphinic acid in 500 ml. of tetrahydrofuran.

The product was a white solid having a melting point of about 310° C. and a molecular weight of 1328 (D.P.=1.9). Partial elemental analysis showed Sn—16.62%, C—57.50%, H—8.10% and P—8.50%. Calculated analysis for a polymer having a Type IV structure wherein $R_1$ and $R_2$ are butyl groups, $R_4$ is benzyl and $R_5$ is hexyl is Sn—16.68%, C—57.40%, H—8.22% and P—8.71%. Infrared analysis supported Type IV structure.

Example 17

As in the two previous examples, di-n-butyltin dihydride, 3.74518 grams (0.01535 mole) was reacted with 6,57594 grams (0.03070 mole) of di-n-pentylphosphinic acid in 500 ml. of tetrahydrofuran. The product was a white solid having a molecular weight of 1190 (D.P.=1.9). Partial elemental analysis showed Sn—18.36%, C—52.30%, H—9.58% and P—9.40%. Calculated analysis for a polymer having a Type IV structure wherein $R_1$ and $R_2$ are butyl groups and $R_4$ and $R_5$ are pentyl groups is Sn—18.45%, C—52.27%, H—9.74% and P-9.63%. Infrared analysis supported the Type IV structure for the compound.

Various modifications may be made in the present invention without departing from the spirit or scope thereof for it is understood that we are limited only as defined in the appended claims.

What is claimed is:

1. Inorganic polymers containing recurring structural units corresponding to the formula

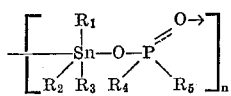

wherein $R_1$, $R_2$ and $R_3$ represent the same or different alkyl, aryl, alkaryl, cycloalkyl or labile group consisting of a hydrogen, hydroxyl, alkoxy, or halogen group; $R_4$ and $R_5$ represent the same or different alkyl, aryl, alkaryl, cycloalkyl or labile group consisting of alkoxy, —OH or halogen group; and $n$ is a rational number greater than 1.

2. Inorganic polymers containing recurring structural units corresponding to the formula

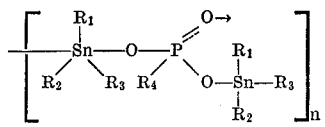

wherein $R_1$, $R_2$ and $R_3$ represent the same or different alkyl, aryl, alkaryl, cycloalkyl or labile group consisting of hydrogen, hydroxyl, alkoxy or halogen group; and $R_4$ represents an alkyl, aryl, alkaryl, cycloalkyl or a labile group consisting of an alkoxy, OH or halogen group and $n$ is a rational number greater than 1.

3. An inorganic polymer corresponding to the formula

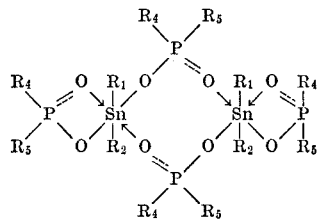

wherein $R_1$ and $R_2$ represent the same or different alkyl, aryl, alkaryl, cycloalkyl, hydrogen, hydroxyl, alkoxy, or halogen group; and $R_3$ and $R_4$ represent the same or different aryl, alkaryl, cycloalkyl, alkoxy or halogen group.

4. A method for preparing a tin-oxygen-phosphorus linked inorganic polymer which comprises: reacting in an inert solvent at a temperature no greater than about the reflux temperature of said solvent, about an equimolar quantity of a tin compound corresponding to the formula

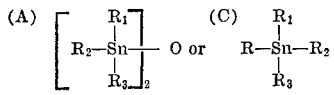

wherein R, $R_1$, $R_2$ and $R_3$ in the Formulas A and C represent the same or different alkyl, aryl, alkaryl, or cycloalkyl group, and in Formula C one of R, $R_1$, $R_2$ or $R_3$ is a halogen or hydrogen, with a phosphorus compound corresponding to the formula

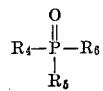

wherein at least one of the $R_4$, $R_5$ or $R_6$ group is an —OH labile group and the remaining groups are independently an alkyl, aryl, alkaryl, cycloalkyl, —OH, alkoxy or halogen group, to prepare a polymer containing recurring structural units corresponding to the formula 5. The method as defined in claim 4 wherein one of R, $R_1$, $R_2$ or $R_3$ is a hydrogen group.

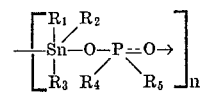

wherein $n$ is a rational number greater than 1.

6. A method for preparing a tin-oxygen-phosphorous linked inorganic polymer which comprises: reacting in an inert solvent at a temperature no greater than about the reflux temperature of said solvent, about an equimolar quantity of a tin compound corresponding to the formula

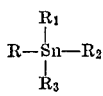

wherein one of the R, $R_1$, $R_2$ and $R_3$ groups consist of a —OH or alkoxy labile group and the remaining groups represent the same or different alkyl, aryl, alkaryl or cycloalkyl group with a phosphorous compound corresponding to the formula

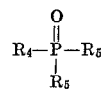

wherein one of $R_4$, $R_5$ or $R_6$ groups is a halogen labile group and the remaining groups represent the same or different —OH, alkoxy, alkyl, aryl, alkaryl or cycloalkyl group to prepare a polymer containing recurring structural units corresponding to the formula

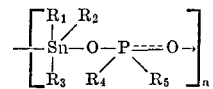

wherein $n$ is an integer greater than 1.

7. A method for preparing a tin-oxygen-phosphorus linked inorganic polymer which comprises reacting, in an inert solvent at a temperature no greater than about the reflux temperature of said solvent, a tin compound corresponding to the formula

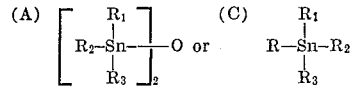

wherein R, $R_1$, $R_2$ and $R_3$ in Formulas A and C represent the same or different alkyl, aryl, alkaryl, or cycloalkyl group and in Formula C represent in addition at least one labile group consisting of a hydrogen, or halogen group with a phosphorous compound corresponding to the formula

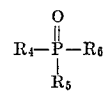

wherein at least two of $R_4$, $R_5$ and $R_6$ represent a —OH group and the remaining group consists of an alkyl, aryl, alkaryl, cycloalkyl, —OH, alkoxy, or halogen group, said tin and phosphorus compound being provided in a gram-mole ratio of said tin compound to said phosphorus of about 2/1 to provide a polymer having recurring structural units corresponding to the formula

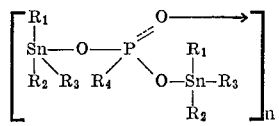

wherein $n$ is a rational number greater than 1.

8. The method as defined in claim 7 wherein the labile group in compound (C) is hydrogen.

9. A method for preparing a tin-oxygen-phosphorous linked inorganic polymer which comprises: reacting, in an inert solvent at a temperature no greater than about the reflux temperature of said solvent, a tin compound corresponding to the formula

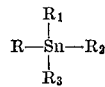

wherein at least one of R, $R_1$, $R_2$ and $R_3$ represent —OH or an alkoxy labile group and the remaining group consist of the same or different alkyl, aryl, alkaryl, cycloalkyl, —OH, hydrogen, alkoxy or halogen group, with a phosphorous compound corresponding to the formula

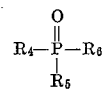

wherein at least two of said $R_4$, $R_5$ and $R_6$ consist of a halogen labile group and the remaining group consists of an alkyl, aryl, alkaryl, cycloalkyl, —OH, alkoxy, or halogen group, said tin and phosphorous compound being provided in a gram-mole ratio of about 2/1 (tin compound/phosphorous compound) to provide a polymer having recurring structural units corresponding to the formula

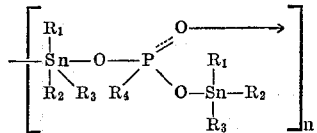

wherein $n$ is an integer greater than 1.

10. A method for preparing a tin-oxygen-phosphorus linked inorganic compound which comprises: reacting, in an inert solvent at a temperature no greater than about the reflux temperature of said solvent, a tin compound corresponding to the formula

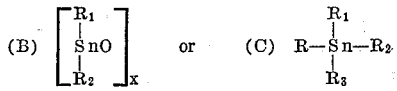

wherein R, $R_1$, $R_2$ and $R_3$ in Formulas B and C represent the same or different aryl, alkyl, alkaryl, or cycloalkyl group and in Formula C in addition two of said groups represent a hydrogen, hydroxyl, alkoxy or halogen group, and $x$ represents a rational number of greater than 1, with a phosphorus compound corresponding to the formula

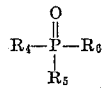

wherein one of $R_4$, $R_5$ or $R_6$ is a —OH group and the remaining groups consist of the same or different alkyl, aryl, alkaryl, cycloalkyl, halogen or alkoxy group, said tin compound and said phosphorus compound being provided in a gram-mole ratio of 1/2 of said tin compound to said phosphorus compound to provide a polymer corresponding to the formula

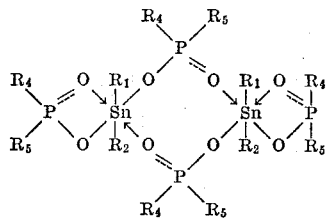

11. The method as defined in claim 10 wherein the two labile groups in compound (C) are hydrogen.

12. A method for preparing a compound corresponding to the formula

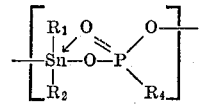

which comprises: reacting in an inert solvent a temperature no greater than about the reflux temperature of said solvent, about an equimolar quantity of a tin compound corresponding to the formula

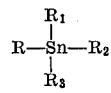

with a phosphorous compound corresponding to the formula

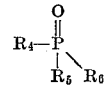

wherein at least two of R, $R_1$, $R_2$ and $R_3$ are the same or different hydrogen or halogen group and the remaining R, $R_1$, $R_2$ and $R_3$ are the same or different alkyl, aryl, alkaryl, or cycloalkyl group and at least two of $R_4$, $R_5$ and $R_6$ are the same or different hydroxyl or alkoxy group with the remaining group being an alkyl, aryl, alkaryl, cycloalkyl, —OH, alkoxy or halogen group.

References Cited

UNITED STATES PATENTS 2,998,407  8/1961  Foster et al. _____ 260—2
3,349,019  10/1967  Podall _____ 260—2

SAMUEL H. BLECH, Primary Examiner

U.S. Cl. X.R.

252—49.7, 74, 75; 260—2 P, 2 M, 33.6 R, 45.75 K, 424—78, 203, 204

PO-1050
(5/69)

UNITED STATES PATENT OFFICE
CERTIFICATE OF CORRECTION

Patent No. 3,634,479                    Dated   January 11, 1972

Inventor(s)   Richard E. Ridenour and Edward E. Flagg

It is certified that error appears in the above-identified patent and that said Letters Patent are hereby corrected as shown below:

Column 5, line 42, change "calculaed" to -- calculated --.

Column 6, line 73, change "32.45" to -- 31.45 --.

Column 7, after the paragraph of Example 11 and before Examples 12-14, insert the following paragraph -- Infrared analysis verified the Type II structure. The product was soluble in organic solvents. --

Column 7, line 71, change "H-6,12" to -- H-6.12 --.

Column 8, line 48, change "6,57594" to -- 6.57594 --.

Column 9, Claim 3, line 28, change "$R_3$ and $R_4$" to -- $R_4$ and $R_5$ --.

Column 9, Claims 4 and 5 run together.

Claim 4, after "contain-" insert -- ing recurring structural units corresponding to the formula --.

Claim 5, delete "ing recurring structural units corresponding to the" to read

-- 5. The method as defined in Claim 4 wherein one of R, $R_1$, $R_2$ or $R_3$ is a hydrogen group. --

Column 10, Claim 6, in the formula, change "$R_5$" to -- $R_6$ --.

Column 10, Claim 9, line 62, change "group" to -- groups --.

Signed and sealed this 1st day of August 1972.

(SEAL)
Attest:

EDWARD M. FLETCHER, JR.                ROBERT GOTTSCHALK
Attesting Officer                       Commissioner of Patents